US007962564B2

(12) United States Patent
Errickson et al.

(10) Patent No.: US 7,962,564 B2
(45) Date of Patent: Jun. 14, 2011

(54) DISCOVERY OF A VIRTUAL TOPOLOGY IN A MULTI-TASKING MULTI-PROCESSOR ENVIRONMENT

(75) Inventors: Richard K. Errickson, Poughkeepsie, NY (US); Welela Haileselaissie, Poughkeepsie, NY (US); Leonard W. Helmer, Jr., Stone Ridge, NY (US); John S. Houston, Hopewell Junction, NY (US); An Zhu, LaGrangeville, NY (US)

(73) Assignee: International Business Machines Corporation, Armonk, NY (US)

( * ) Notice: Subject to any disclaimer, the term of this patent is extended or adjusted under 35 U.S.C. 154(b) by 279 days.

(21) Appl. No.: 12/036,979

(22) Filed: Feb. 25, 2008

(65) Prior Publication Data

US 2009/0217007 A1 Aug. 27, 2009

(51) Int. Cl.
*G06F 9/30* (2006.01)
(52) U.S. Cl. ......... 709/212; 709/223; 709/230; 370/235
(58) Field of Classification Search .................... 709/212
See application file for complete search history.

(56) References Cited

U.S. PATENT DOCUMENTS

| | | | | |
|---|---|---|---|---|
| 3,643,227 A | * | 2/1972 | Smith et al. .................... | 718/105 |
| 5,170,472 A | | 12/1992 | Cwiakala et al. | |
| 5,339,413 A | | 8/1994 | Koval et al. | |
| 5,343,867 A | * | 9/1994 | Shankar ........................ | 600/481 |
| 5,388,266 A | | 2/1995 | Frey et al. | |
| 5,524,212 A | * | 6/1996 | Somani et al. ................ | 711/121 |
| 5,777,987 A | | 7/1998 | Adams et al. | |
| 6,073,181 A | | 6/2000 | Holland et al. | |
| 6,289,386 B1 | | 9/2001 | Vangemert | |
| 6,483,804 B1 | * | 11/2002 | Muller et al. .................. | 370/230 |
| 6,507,567 B1 | | 1/2003 | Willars | |
| 6,741,552 B1 | | 5/2004 | McCrosky et al. | |
| 6,862,609 B2 | | 3/2005 | Merkey | |
| 6,993,032 B1 | | 1/2006 | Dammann et al. | |
| 7,093,024 B2 | | 8/2006 | Craddock et al. | |
| 7,200,704 B2 | | 4/2007 | Njoku et al. | |
| 7,283,473 B2 | | 10/2007 | Arndt et al. | |
| 7,290,077 B2 | | 10/2007 | Gregg et al. | |

(Continued)

OTHER PUBLICATIONS

Jeong et al.; A Study on TCP Buffer Management Algorithim for Improvement on Network Performance in Grid Environment; 2004 pp. 281-288.

(Continued)

*Primary Examiner* — Wing F Chan
*Assistant Examiner* — Tesfay Yohannes
(74) *Attorney, Agent, or Firm* — Cantor Colburn LLP; Steven Chiu

(57) ABSTRACT

A computer program product, apparatus and method for identifying processors in a multi-tasking multiprocessor network, the computer program product including a tangible storage medium readable by a processing circuit and storing instructions for execution by the processing circuit for performing a method including storing a service record for a port to which an LID has been assigned, retrieving service records for nodes to which channel paths may connect, retrieving path records that provide address destinations for the nodes identified in the service records, initiating channel initialization for the channel paths defined for the port and removing the service record for the port.

19 Claims, 5 Drawing Sheets

U.S. PATENT DOCUMENTS

| | | | |
|---|---|---|---|
| 7,366,813 B2 | 4/2008 | Gregg et al. | |
| 7,467,402 B2 | 12/2008 | Pennington et al. | |
| 7,602,774 B1 | 10/2009 | Sundaresan et al. | |
| 7,613,183 B1 | 11/2009 | Brewer et al. | |
| 2001/0014954 A1 | 8/2001 | Purcell et al. | |
| 2001/0030943 A1 | 10/2001 | Gregg et al. | |
| 2002/0107903 A1* | 8/2002 | Richter et al. | 709/201 |
| 2002/0194245 A1* | 12/2002 | Simpson et al. | 709/101 |
| 2003/0005039 A1 | 1/2003 | Craddock et al. | |
| 2003/0061379 A1 | 3/2003 | Craddock et al. | |
| 2004/0123068 A1 | 6/2004 | Hashimoto | |
| 2004/0202189 A1 | 10/2004 | Arndt et al. | |
| 2004/0221070 A1* | 11/2004 | Ortega et al. | 710/5 |
| 2005/0018669 A1 | 1/2005 | Arndt et al. | |
| 2005/0060445 A1 | 3/2005 | Beukema et al. | |
| 2005/0120237 A1* | 6/2005 | Roux et al. | 713/200 |
| 2005/0144313 A1 | 6/2005 | Arndt et al. | |
| 2006/0048214 A1 | 3/2006 | Pennington et al. | |
| 2006/0230185 A1 | 10/2006 | Errickson et al. | |
| 2006/0230209 A1 | 10/2006 | Gregg et al. | |
| 2006/0230219 A1 | 10/2006 | Njoku et al. | |
| 2007/0239963 A1* | 10/2007 | Yao et al. | 712/11 |
| 2007/0245050 A1 | 10/2007 | Gregg et al. | |
| 2008/0028116 A1 | 1/2008 | Gregg et al. | |
| 2008/0109891 A1 | 5/2008 | Greenwald et al. | |
| 2008/0196041 A1 | 8/2008 | Gregg et al. | |
| 2009/0094603 A1 | 4/2009 | Hiltgen et al. | |

OTHER PUBLICATIONS

Huang et al., InfiniBand Support in Xen Virtual Machine Environmant, Technical Report, OSU-CISCR-10/05-TR63, Oct 2005.
"Infiniband Architecture Specification vol. 1", Release 1.0.A, Jun. 19, 2001, pp. 40, 71, 193-194, 366-370, 665-667.
Wu et al., "Design of An InfiniBand Emulator over Myrinet: Challenges, Implementation, and Performance Evaluation", Technical Report, OSU-CISRC-2/01-TR03, 2003.
Non-Final Office Actiond dated Jun. 23, 2010 for U.S. Appl. No. 12/036,986.
Non-Final Office Actiond dated Oct. 1, 2010 for U.S. Appl. No. 12/037,046.
Non-Final Office Actiond dated May 17, 2010 for U.S. Appl. No. 12/037,046.
Office Action made Final dated Oct. 6, 2010 for U.S. Appl. No. 12/037,048.
Non-Final Office Actiond dated Apr. 9, 2010 for U.S. Appl. No. 12/037,048.
Office Action Made Final dated Aug. 12, 2010 for U.S. Appl. No. 12/051,634.
Non-Final Office Actiond dated Mar. 22, 2010 for U.S. Appl. No. 12/051,634.
Non-Final Office Actiond dated May 13, 2010 for U.S. Appl. No. 12/051,631.
Non-Final Office Actiond dated Jun. 1, 2010 for U.S. Appl. No. 12/051,630.

* cited by examiner

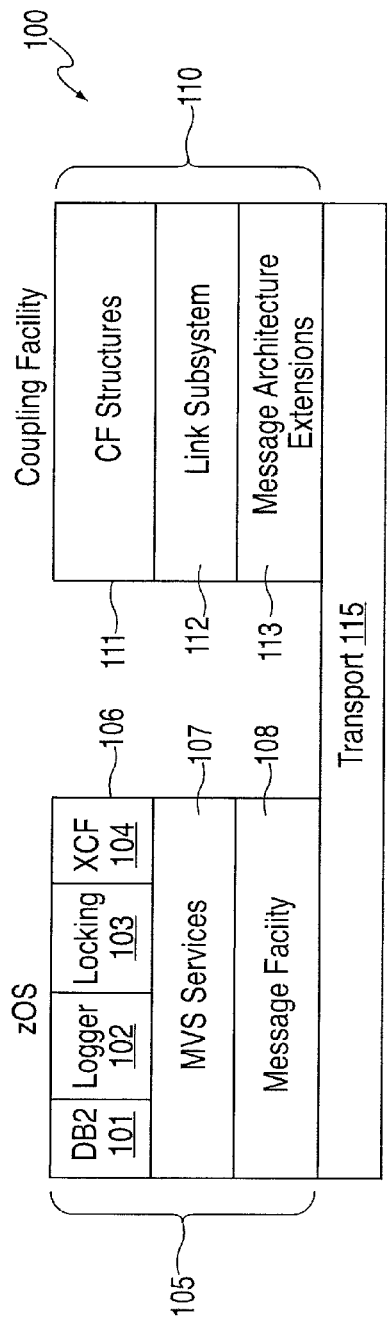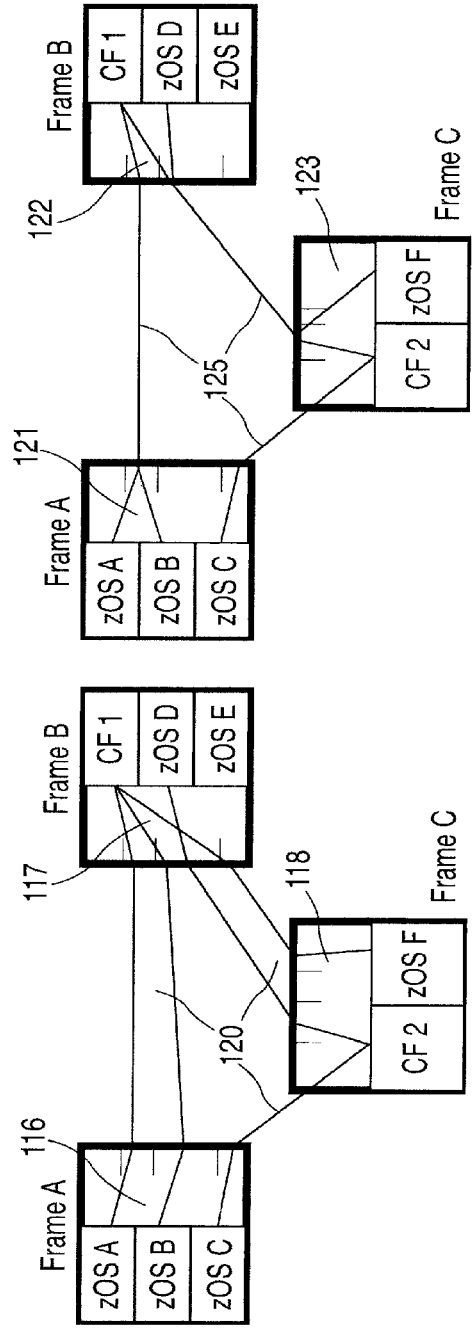

DISCOVERY OF A VIRTUAL TOPOLOGY IN A MULTI-TASKING MULTI-PROCESSOR ENVIRONMENT

BACKGROUND OF THE INVENTION

1. Field of Invention

The present disclosure relates generally to multi-tasking multiprocessor systems, and in particular, to discovery of a virtual topology in a multi-tasking multi-processor system.

2. Description of Background

In many mainframe computers, multiple processors are joined into a single unit, sharing the same name and data sets. Such multi-tasking, multi-processor systems represent an instance of a computer system running on one or more physical computers. These multiple mainframes may act as a single mainframe. Such systems can be broken down into LPARs, or logical partitions, each running a different operating system.

InfiniBand (IB), which is a form of System Area Network (SAN), defines a multicast facility that allows a Channel Adapter (CA) to send a packet to a single address and have it delivered to multiple ports. Each multicast group is assigned a unique address, and end-nodes that wish to participate in a multicast group do so via a 'Join' process initiated by the candidate participant with the Subnet Manager. The InfiniBand architecture is described in the InfiniBand standard, which is available at http://www.infinibandta.org and also hereby incorporated by reference.

Current multi-tasking multi-processor systems implement coupling technologies that are single threaded, and direct connected point-to-point links that support a single channel per physical link. The connections follow a pre-defined topology that not only describes the hardware connections, but also the software correlations. The hardware plays a significant role in helping to establish and maintain the link.

The transition of multi-processor multi-tasking systems that implement InfiniBand technology, with its greater virtualization of links, and potentially switched network, creates a number challenges including: the virtualization of the link to carry multiple distinct channels; finding and identifying the correct partner for the link; and exchanging enough information to guarantee that the connection can be made and maintained.

BRIEF SUMMARY OF THE INVENTION

An exemplary embodiment includes a computer program product for identifying processors in a multi-tasking multi-processor network, the computer program product including a tangible storage medium readable by a processing circuit and storing instructions for execution by the processing circuit for performing a method including storing a service record for a port to which a LID has been assigned, retrieving service records for nodes to which channel paths may connect, retrieving path records that provide address destinations for the nodes identified in the service records, initiating channel initialization for the channel paths defined for the port and removing the service record for the port.

Another exemplary embodiment includes an apparatus for identifying processors in a multi-tasking multiprocessor network, the apparatus including a processor, a rendezvous function coupled to the processor and a channel initialization function coupled to the processor, wherein the processor stores a service record for a port to which an LID has been assigned, retrieves service records for nodes to which channel paths may connect and retrieves path records that provide address destinations for the nodes identified in the service records.

A further exemplary embodiment includes a method for identifying processors in a multi-tasking multiprocessor network, the method including storing a service record for a port to which an LID has been assigned, retrieving service records for nodes to which channel paths may connect, retrieving path records that provide address destinations for the nodes identified in the service records, initiating channel initialization for the channel paths defined for the port and removing the service record for the port.

Other articles of manufacture, apparatuses, and/or methods according to embodiments will be or become apparent to one with skill in the art upon review of the following drawings and detailed description. It is intended that all such additional articles of manufacture, apparatuses, and/or methods be included within this description, be within the scope of the present invention, and be protected by the accompanying claims.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 1A illustrates an exemplary embodiment of a multi-tasking multi-processor InfiniBand system;

FIG. 1B illustrates an example of a multi-tasking multi-processor environment;

FIG. 1C illustrates an example of a multi-tasking multi-processor environment in accordance with an exemplary embodiment;

The detailed description explains the preferred embodiments of the invention, together with advantages and features, by way of example with reference to the drawings.

DETAILED DESCRIPTION OF THE INVENTION

In accordance with an aspect of the present invention, an IB architected database, a subnet administrator, registers and ports in a multi-tasking multi-processor IB environment, which provide support for the multi-tasking multi-processor IB system on InfiniBand. The topology of the multi-tasking multi-processor IB environment is mapped implementing the port registering information. In an exemplary embodiment, through a set of queries, and the matching of unique identifiers, the correlation of intended end points can be made. Once the correlation of the intended end points has been performed, the queue pairs for the channel can be connected.

Figure 1D:
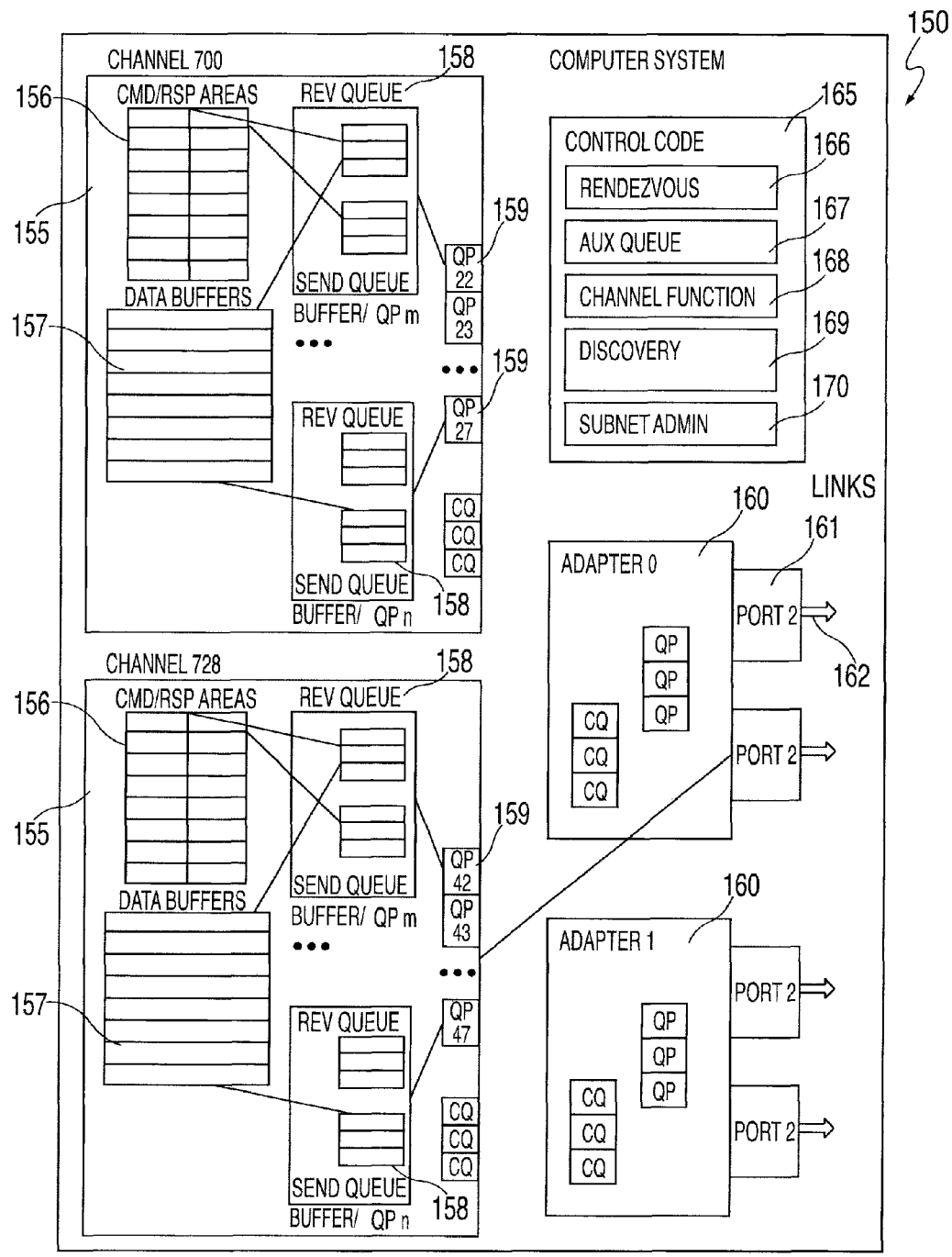
FIG. 1D illustrates an example of a multi-tasking multi-processor environment in accordance with an exemplary embodiment.

FIG. 1A illustrates an exemplary embodiment of a multi-tasking multi-processor InfiniBand system 100. The system 100 can include an operating system 105 (e.g., IBM zOS) having a top layer including a relational database 101 a logging facility 102, a locking facility 103 and a cross system coupling facility (XCF). The operating system 105 can further include a multiple virtual storage (MVS) services layer 107 and a message facility layer 108. The system 100 can further include a coupling facility (CF) 110 having a CF structures layer 111, a link subsystem 112 and a message architecture extensions layer 113. In an exemplary embodiment, a transport layer 115 is disposed between and couples the operating system 105 and the CF 110. In an exemplary implementation, the transport layer 115 implements InfiniBand. FIG. 1B illustrates an example of a multi-tasking multi-processor environment. The example shows three mainframes A, B, C connected into a two different Parallel Sysplex environments using the previous generation of coupling transports. zOS A, zOS B and zOS F are all tied together through a Coupling Facility (CF1). zOS C and zOS D are tied together through CF2. Meanwhile zOS E is a stand alone operating system. In this configuration separate channels are connected through separate adapters in the separate frames. It is appreciated that multiple internal channels 116, 117, 118 include separate external connections 120. FIG. 1C illustrates an example of a multi-tasking multi-processor environment in accordance with an exemplary embodiment. In this example, multiple internal channels 121, 122, 123 share the same physical connection 125. FIG. 1 D illustrates an example of a multi-tasking multi-processor environment 150 in accordance with an exemplary embodiment. The environment 150 can include one or more channels 155, each channel including command/response areas 156, data buffers 157, receive/send queues 158 and adapters 160 for mapping the channels 155 to ports 161 and ultimately communication links 162, as discussed further herein. The channels 155 can further include queue pairs 159 as discussed further herein. The system 150 can further include control code 165 having functions including but not limited to: rendezvous 166, auxiliary queue 167, channel 168, discovery 169 and subnet administrator 170.

Figure 2:
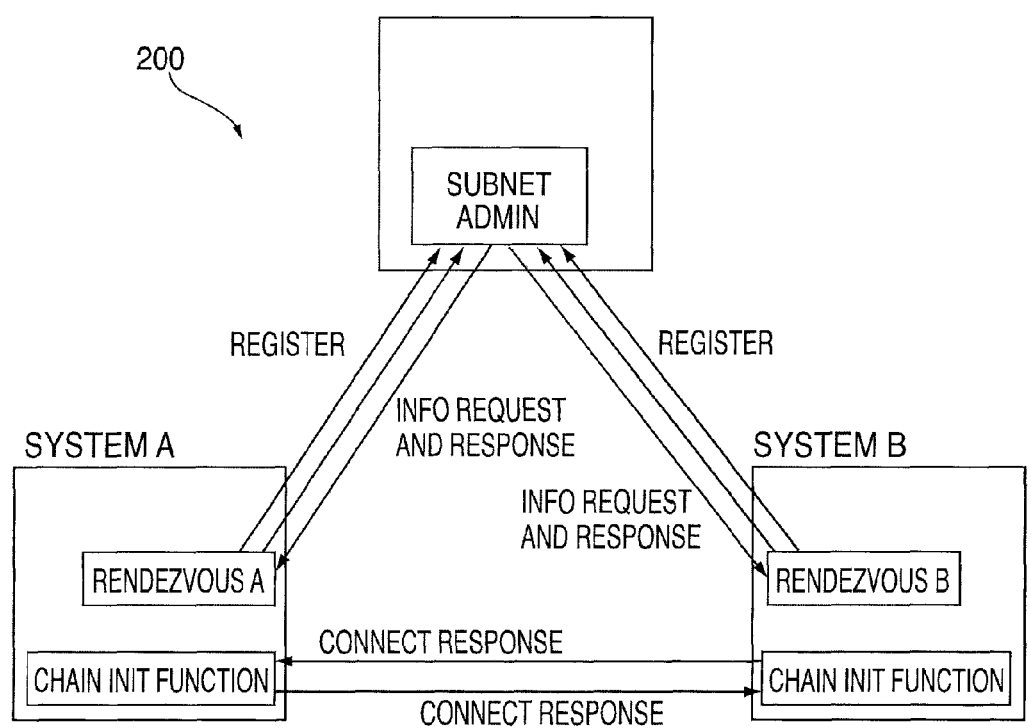
FIG. 2 illustrates a block diagram of multiple multi-tasking multi-processor systems in accordance with an exemplary embodiment.

FIG. 2 illustrates a block diagram of multiple multi-tasking multi-processor systems in accordance with an exemplary embodiment. A first system A is in communication with a second system B via a third system F. Each of the systems A, B can include a rendezvous function as well as a channel initialization function. Furthermore, the third system F can include a subnet administrator (SA).

In an exemplary embodiment, the rendezvous functions enable the systems A, B to discover that the respective systems A, B are present in a common network. The rendezvous functions further enable the systems A, B to make connections with the other system. In an exemplary embodiment, the rendezvous functions are executed before the channel initialization functions, since the channels cannot be initialized until after the end points are known. Furthermore, in an exemplary embodiment, the rendezvous functions run after the subnet manager has assigned a Local ID (LID) to the port, because no application can use the port until after the LID has been assigned. In an exemplary embodiment, the rendezvous functions can access subnet administration functions within the subnet.

In an exemplary embodiment, the subnet administrator provides a central repository for information about nodes in the network as well as communications protocols for the nodes. The information about the nodes includes service records, each of which describes a specific service that is provided by a node, and path records, which describe the addressing of individual nodes in the network. In an exemplary embodiment, the rendezvous function retrieves relevant information for the multi-tasking multi-processor services from the SA, as well as which nodes provide the services. The rendezvous functions further provides information that is required for connections available to the channel initialization functions. In an exemplary embodiment, the rendezvous function is single-threaded: it has only one outstanding operation per port at any time. In this way, it can correlate responses with requests, since the uniquely identifying aspects of the management datagram (MAD) are hidden from this layer.

Figure 3:
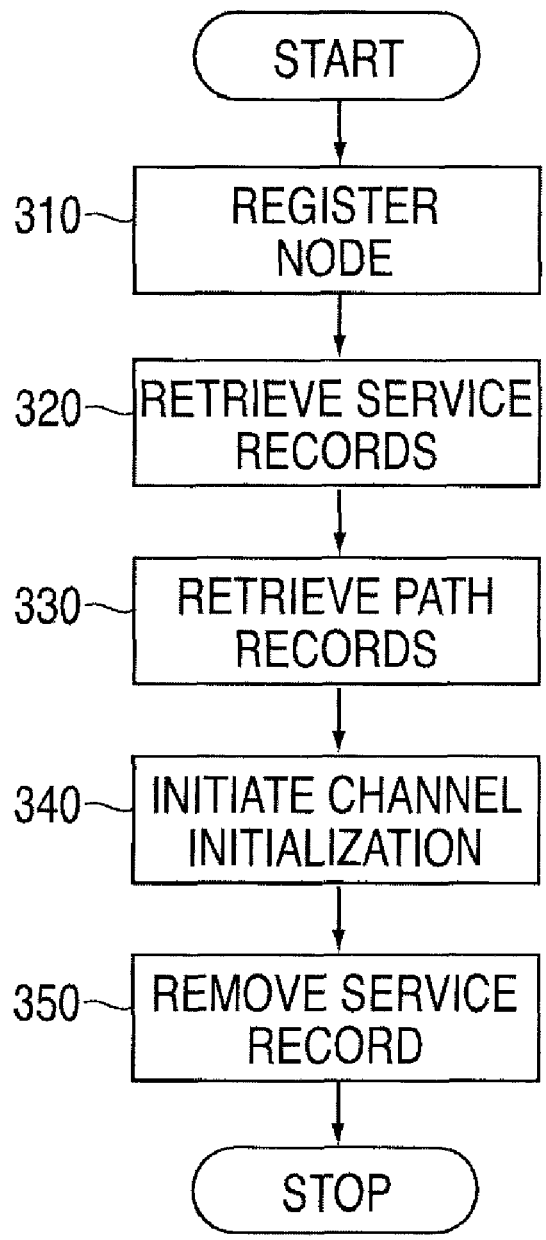
FIG. 3 illustrates a flow chart for a method of virtual topology discovery in a multi-tasking multi-processor environment.

FIG. 3 illustrates a flow chart for a method 300 of virtual topology discovery in a multi-tasking multi-processor environment. In an exemplary embodiment, the rendezvous functions first register the node by storing a service record at the subnet administrator at block 310. When the LID is assigned by the SA to a port, one of the actions that occurs is to begin the rendezvous function. The first step in the rendezvous function is to create a service record with the information that indicates that the multi-tasking multi-processor IB function is supported at the globally unique identifier (GUID) for the port. The service record is sent to the SA. This step concludes when the response to this request is received.

At block 320, the rendezvous functions then retrieve from the SA service records for all nodes to which channel paths at this node may connect. When the response to the node registration is received, the rendezvous functions then retrieve from service records for each of the systems for which CIB-type channel paths at this system have defined connected systems. This retrieval is performed singly by node so that the reliable multi-packet protocol (RMPP) layer need not be implemented at either the SA or the agents that communicate with the RMPP. As each response is received, the rendezvous function requests the next service record until it has received responses to each request. The rendezvous function is notified even when the response from the SA indicates that data from the node were not available. For those nodes for which data were returned successfully, the rendezvous function moves to the path record retrieval step; for the nodes for which data were not successfully returned, the path record retrieval step is skipped, and the channel initialization function is suspended. Because this node has already registered at the SA, any node for which this node finds no information will, when it begins its rendezvous function, find this node, and thus the remote node will become the driver of the initialization procedure.

At block 330, the rendezvous functions retrieve from the SA path records that provide address destinations for the nodes that are identified by the service records. The service record for a node and service contains the GUID for the node, but that cannot be used to address the node within the network. In an exemplary embodiment, the addressing can be accomplished via a LID. The subnet administrator associates a LID with a service global identifier (GID) when the node registration occurs and can therefore fabricate a path record in response to a query. As such, after the subnet administrator has received a response to a query of a service record, the rendezvous function queries the SA to obtain the path record, which provides addressability to the target node.

At block 340, the rendezvous functions initiate channel initialization for the paths that are defined for the port. The initiation of channel initialization functions is accomplished in two cases: the remote LID is not known or the remote LID is known. The processing is slightly different for the not known and known cases. When the remote LID is known, the local node continues in the initialization procedure by connecting the local queue pairs to the remote queue pairs. The remote LID can be unknown only when the information for the remote side is not available at the SA, which can occur when the remote system is down. In these cases, the channel is initialized in order to receive connection requests, since it cannot create a connection if it does not know the identity of its partner. This initialization allows the channel initialization code to be ready for connections which will be initiated by the remote side when it executes its initialization.

At block 350, the rendezvous functions then remove from the SA the service record for the port. The removal of registration from the SA is done in order to reduce the amount of stale information in the SA. (Stale information is information that had been stored at the SA but is no longer valid, e.g., if a system crashes or executes a power-on reset). Once all defined connections are made for a given link, there is no need to maintain at the SA the information for that link, since there are no remaining connections to be made. In an exemplary embodiment, this removal of the service record is a first step to solve the problem of stale data. Additional steps are implemented to reduce stale information because a system may crash or execute a POR before all connections are made for all links can contribute to additional stale information.

In an exemplary embodiment, when the system again initializes itself, any new information that it writes to the SA writes over any stale data that may be present at the SA for that GUID. As such, if information in the service record (such as the system name or the meta-rendezvous queue pair) changes, the information from the old record is replaced by the new information. This feature prevents the accumulation of obsolete data.

In an exemplary embodiment, the removal of the registration is implemented via the rendezvous functions. At the completion of link initialization for a CIB channel path, the rendezvous function is called. If no more defined links that have not completed link initialization remain, a command is sent to the SA to delete the service record. In an exemplary embodiment, the rendezvous function is restarted when connections need to be re-established. In addition, the rendezvous function removes from its list any systems for which no more channels can connect. The removal of a channel from the configuration tickles the rendezvous function to update its list. For example, in the case in which only one channel is defined for a link and the rendezvous function has not yet completed for that path, the rendezvous function must successfully complete and remove its data from the SA if that one channel path is de-configured.

Technical effects of exemplary embodiments include the ability to find a provider of a service, and to identify the specific provider within that system that matched the configuration. Abilities further include identifiers that allow the rendezvous function to match the resources on different systems to their configuration end-points.

Figure 4:
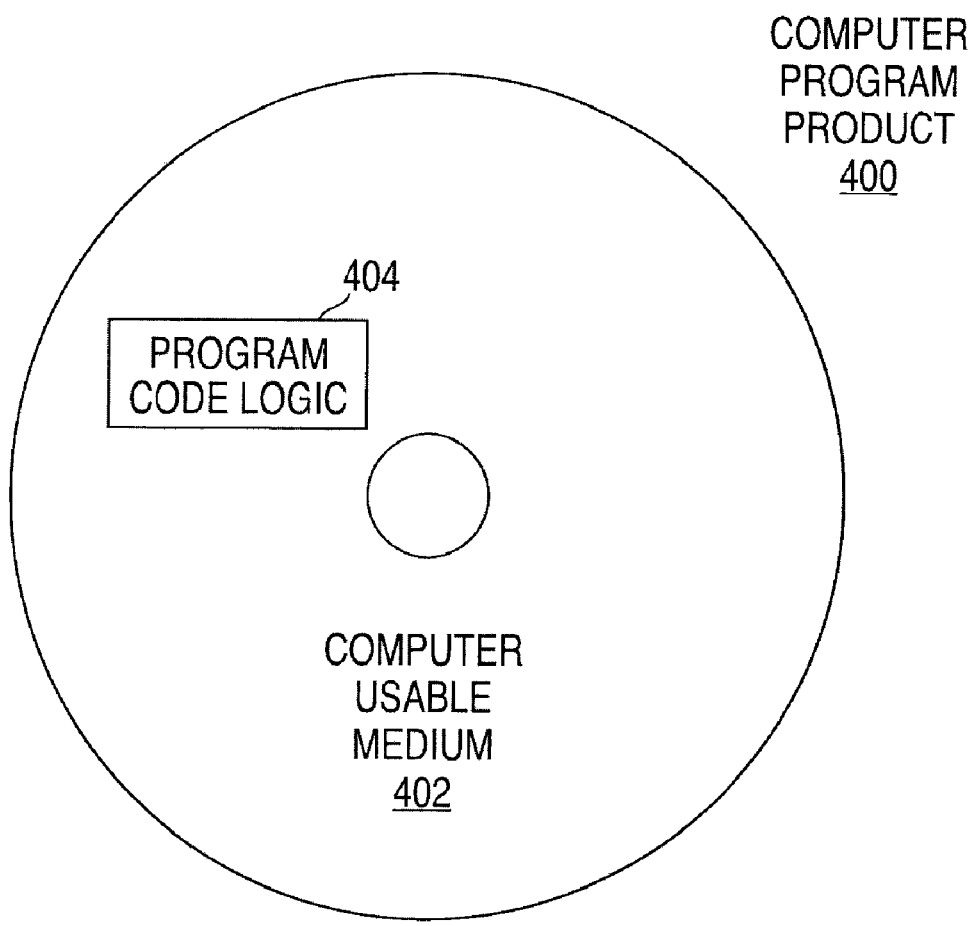
FIG. 4 depicts one embodiment of an article of manufacture incorporating one or more aspects of the present invention.

As described above, embodiments can be embodied in the form of computer-implemented processes and apparatuses for practicing those processes. In exemplary embodiments, the invention is embodied in computer program code executed by one or more network elements. Embodiments include a computer program product 400 as depicted in FIG. 4 on a computer usable medium 402 with computer program code logic 404 containing instructions embodied in tangible media as an article of manufacture. Exemplary articles of manufacture for computer usable medium 402 may include floppy diskettes, CD-ROMs, hard drives, universal serial bus (USB) flash drives, or any other computer-readable storage medium, wherein, when the computer program code logic 404 is loaded into and executed by a computer, the computer becomes an apparatus for practicing the invention. Embodiments include computer program code logic 404, for example, whether stored in a storage medium, loaded into and/or executed by a computer, or transmitted over some transmission medium, such as over electrical wiring or cabling, through fiber optics, or via electromagnetic radiation, wherein, when the computer program code logic 404 is loaded into and executed by a computer, the computer becomes an apparatus for practicing the invention. When implemented on a general-purpose microprocessor, the computer program code logic 404 segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A computer program product for identifying processors in a multi-tasking multiprocessor network, the computer program product comprising:
a tangible non-transitory storage medium readable by a processing circuit and storing instructions for execution by the processing circuit for performing a method comprising:
storing a service record for a port to which a local identifier [LID] has been assigned;
retrieving service records singly for each node of a plurality of nodes to which channel paths may connect: each channel path having a local queue pair and a remote queue pair;
associating a global identifier (GID) with the LID to generate path records and to provide address destinations;
retrieving path records that provide the address destinations for the nodes identified in the service records;
matching the GID and the LID to establish a correlation of intended endpoints, one of the intended end points including the local queue pair and another of the intended endpoints including the remote queue pair;
initiating channel initialization for the channel paths defined for the port, via at least one of the local and remote queue pairs, and connection requested between the intended endpoints; and
removing the service record for the port.

2. The computer program product as claimed in claim 1 wherein the service record indicates that a function associated with a port in the network is supported at a globally unique identifier for the port.

3. The computer program product as claimed in claim 1, wherein for each node in which no service record is retrieved, no path record is retrieved and channel initialization is suspended.

4. The computer program product as claimed in claim 1 wherein the method further comprises registering each node for which a service record is retrieved.

5. The computer program product as claimed in claim 4 wherein the path record is generated in response to a query for the service record.

6. The computer program product as claimed in claim 1 wherein the method further comprises in response to a the LID being known, performing the channel initialization via queue pairs coupled to the network.

7. The computer program product as claimed in claim 1 wherein the method further comprises in response to a the LID being unknown, and in response to performing the channel initialization, receiving connection requests.

8. The computer program product as claimed in claim 1 wherein removing the service record for the port comprises removing a node registration.

9. An apparatus for identifying processors in a multi-tasking multiprocessor network, the apparatus comprising:
   a processor;
   a rendezvous function coupled to the processor; and
   a channel initialization function coupled to the processor, wherein the processor:
   stores a service record for a port to which a local identifier (LID) has been assigned;
   retrieving service records singly for each node of a plurality of nodes to which channel paths may connect, each channel path having a local queue pair and a remote queue pair;
   associates a global identifier (GID) with the LID to generate path records and to provide address destinations;
   retrieves path records that provide the address destinations for the nodes identified in the service records; and
   matches the GID and the LID to establish a correlation of intended endpoints, one of the intended end points including the local queue pair and another of the intended endpoints including the remote queue pair.

10. The apparatus as claimed in claim 9 wherein the channel initialization function initiates channel initialization for the channel paths defined for the port, via at least one of the local and remote queue pairs, and connection requested between the intended endpoints.

11. The apparatus as claimed in claim 10 wherein the processor removes the service record for the port.

12. The apparatus as claimed in claim 9 wherein the path record is generated in response to a query for the service record.

13. The apparatus as claimed in claim 9 wherein in response to the LID being known, the channel initialization is performed via queue pairs coupled to the processor.

14. The apparatus as claimed in claim 9 wherein in response to the LID being unknown, and in response the channel initialization being performed, the channel initialization function is configured to receive connection requests.

15. A method for identifying processors in a multi-tasking multiprocessor network, the method comprising:
   storing a service record for a port to which a local identifier (LID) has been assigned;
   retrieving service records singly for each node of a plurality of nodes to which channel paths may connect, each channel path having a local queue pair and a remote queue pair;
   associating a global identifier (GID) with the LID to generate path records and to provide address destinations;
   retrieving path records that provide the address destinations for the nodes identified in the service records;
   matching the GID and the LID to establish a correlation of intended endpoints, one of the intended end points including the local queue pair and another of the intended endpoints including the remote queue pair;
   initiating channel initialization for the channel paths defined for the port, via at least one of the local and remote queue pairs, and connection requested between the intended endpoints; and
   removing the service record for the port.

16. The method as claimed in claim 15 further comprising registering each node for which a service record is retrieved.

17. The method as claimed in claim 16 wherein the path record is generated in response to a query for the service record.

18. The method as claimed in claim 15 further comprising in response to the LID being known, performing the channel initialization via queue pairs coupled to the network.

19. The method as claimed in claim 15 further comprising in response to the LID being unknown, and in response to performing the channel initialization, receiving connection requests.

* * * * *